(12) United States Patent
Kameda et al.

(10) Patent No.: US 7,089,739 B2
(45) Date of Patent: Aug. 15, 2006

(54) STRUCTURE AND METHOD FOR THE AFFIXING OF A PRETENSIONER GAS GENERATOR

(75) Inventors: Shigetsugu Kameda, Koga (JP); Yasumasa Miyake, Koga (JP); Masayuki Hoshi, Koga (JP)

(73) Assignee: Sanoh Industrial Co., Ltd., Koga (JP)

(*) Notice: Subject to any disclaimer, the term of this patent is extended or adjusted under 35 U.S.C. 154(b) by 0 days.

(21) Appl. No.: 11/023,356

(22) Filed: Dec. 29, 2004

(65) Prior Publication Data

US 2005/0151364 A1 Jul. 14, 2005

(30) Foreign Application Priority Data

Jan. 13, 2004 (JP) ............................. 2004-004871

(51) Int. Cl.
*F02N 13/00* (2006.01)
*B60R 22/36* (2006.01)

(52) U.S. Cl. ........................................ 60/632; 280/806

(58) Field of Classification Search ................. 60/407, 60/632; 280/728.2, 806
See application file for complete search history.

(56) References Cited

U.S. PATENT DOCUMENTS

| 5,875,634 | A  | * | 3/1999 | Wohlenberg et al. | ......... | 60/632 |
| 6,345,504 | B1 | * | 2/2002 | Takehara et al. | .............. | 60/632 |
| 6,363,722 | B1 | * | 4/2002 | Takehara et al. | .............. | 60/632 |
| 6,419,176 | B1 | * | 7/2002 | Mizuno | ....................... | 242/374 |
| 6,532,739 | B1 | * | 3/2003 | Kameyoshi et al. | ......... | 60/632 |
| 6,669,131 | B1 | * | 12/2003 | Takehara et al. | .............. | 60/632 |
| 6,722,600 | B1 | * | 4/2004 | Hamaue et al. | ............... | 60/632 |

FOREIGN PATENT DOCUMENTS

| JP | A-08-324383 | 12/1996 |
| JP | A-09-002204 | 1/1997 |
| JP | A-2000-292098 | 10/2000 |
| JP | A-2000-329500 | 11/2000 |
| JP | A-2001-021293 | 1/2001 |
| JP | A-2002-145012 | 5/2002 |
| JP | A-2002-331911 | 11/2002 |
| JP | A-2003-212087 | 7/2003 |

* cited by examiner

*Primary Examiner*—Edward K. Look
*Assistant Examiner*—Michael Leslie
(74) *Attorney, Agent, or Firm*—Posz Law Group, PLC; R. Eugene Varndell, Jr.

(57) ABSTRACT

The provision of a structure and method for the affixing of a pretensioner gas generator by which the function of the pretensioner can be improved without the need to use an additional component part or to increase the thickness of the wall of the pipe. In the structure for the affixing of a pretensioner gas generator, a gas generator 16 is held in a pipe 12 by the expanding of the end part 12b of a pipe 12 to form a housing part 15 for the gas generator 16, the gas generator 16 is housed in the housing part 15, and the opened end 15b of the pipe 12 in the structure for the affixing of the gas generator is calked, an annular rib 17 projects outward in the axial direction from the inner circumferential edge part of the calked part A. In the method for the affixing of the gas generator, a press is used to form the abovementioned annular rib 17.

6 Claims, 7 Drawing Sheets

STRUCTURE AND METHOD FOR THE AFFIXING OF A PRETENSIONER GAS GENERATOR

BACKGROUND OF THE INVENTION

1. Field of the Invention

The present invention relates to a structure and method for the affixing of a pretensioner gas generator used in seat belt devices fitted in vehicles such as cars.

2. Description of the Related Art

Seat belt devices are provided in vehicles such as cars as means for protecting the passenger at moments of sudden acceleration or deceleration. The modern seat belt device comprises a pretensioner for, when the vehicle is subject to impact such as at moments of collision, retracting the seat belt further than the state in which it has been fastened by the passenger and restraining the passenger against the seat belt with a powerful force.

Although a range of systems of pretensioner are available, one such system is a gas pressure-type pretensioner comprising a gas generator that generates a high-pressure gas at the moment of collision of the car, a driving member such as balls or the like that retract the seat belt around a retractor, and a pipe that leads the high-pressure gas from the gas generator to the driving member (see, for example, Japanese Patent Application Laid-open No. 2001-63519).

In pretensioners of a structure such as this, generally, the end part of the pipe in which the driving member such as a balls are housed is expanded to form a housing part for the gas generator, a gas generator is fitted into the housing part through an opened end of the housing part, and the gas generator is held in the end part of the pipe by the calking of the opened end of the housing part (see, for example, Japanese Patent Application Laid-open No. 2002-331911).

However, with improved safety in mind, the trend in recent years has been towards further increases in the seat belt retracting force produced by the above mentioned pretensioners.

However, there have been instances where gas generators with an increased amount of explosive held in pipes of the prior art where the end part of the pipe, that is to say, the calked part, has broken due to the explosive force generated by the gas generator resulting in the detachment of the gas generator.

Although, as a countermeasure for this, the installation of a separate component part in the pipe and affixing of the gas generator using this separate component part has been considered, this has an associated unavoidable cost increase. In addition, although the thickening of the thickness of the wall of the pipe and the increasing of the strength of the calked part have been considered, these measures invite the increased weight of the pretensioner and a greater complexity of the machining thereof and, naturally, these also lead to a cost increase.

SUMMARY OF THE INVENTION

Thereupon, an object of the present invention is to improve the function of the pretensioner without the need to use an additional component part or to increase the thickness of the wall of the pipe, that is to say, an object of the present invention is to provide a structure and method for the affixing of a pretensioner gas generator by which gas generators containing an increased quantity of explosive can be more securely held.

A structure for the affixing of a pretensioner gas generator, according to a first embodiment of the present invention, that achieves the abovementioned object is notable in that, in a structure for the affixing of a pretensioner gas generator in which the gas generator is held in a pipe by the expanding of the end part of the pipe to form a housing part for the gas generator, the housing of the gas generator in the housing part, and the calking of the opened end of the pipe, an annular rib that projects outward in the axial direction is formed in the inner circumferential edge part of the calked part.

In addition, a structure for the affixing of a pretensioner gas generator, according to a second embodiment of the present invention, is notable in that, in the abovementioned first embodiment the diameter of the abovementioned annular rib is formed to be larger than the outer diameter of the abovementioned gas generator.

Furthermore, in a structure for the affixing of a pretensionor gas generator according to a third embodiment of the present invention, the projecting height of the abovementioned rib outward in the axial direction is formed to be no less than 0.15 times the thickness of the annular rib.

In addition, the pretensioner gas generator affixing method, according to a fourth embodiment of the present invention, is notable in that the annular rib described in the abovementioned first to third embodiments is formed by press-processing.

According to the structure for the affixing of the pretensioner gas generator of the abovementioned first embodiment of the present invention, because an annular rib that projects outward in the axial direction is formed in the inner circumferential edge part of the calked part, the strength of the calked part is increased by the presence of the annular rib wherein, accordingly, without the need to use an additional component part or to increase the thickness of the wall of the pipe, a gas generator containing an increased quantity of explosive can be more securely held.

In addition, according to the structure for the affixing of the pretensioner gas generator of the abovementioned second embodiment of the present invention, because the diameter of the abovementioned annular rib is formed to be larger than the outer diameter of the abovementioned gas generator, detachment of the gas generator can be effectively prevented and the gas generator can be more securely held due to the provision of the annular rib.

Furthermore, according to the structure for the affixing of the pretensioner gas generator of the abovementioned third embodiment of the present invention, because the projecting height of the abovementioned rib outward in the axial direction is formed to be no less than 0.15 times that of the thickness of the annular rib, an annular rib part of sufficient strength is formed and a high-strength calked part is able to be produced with certainty.

According to the method for the affixing of the pretensioner gas generator according to the fourth embodiment of the present invention, because the abovementioned annular rib is formed by press-processing the formation thereof is simple and, moreover, because the yield strength in the circumference of the annular rib is increased as a result of work hardening and a high-strength calked part is able to be produced, the gas generator is less likely to detach.

DESCRIPTION OF THE PREFERRED EMBODIMENTS

A detailed description of an embodiment of the above-mentioned structure and method for the affixing of the pretensioner gas generator pertaining to the present invention is given below with reference to the drawings.

Figure 1:
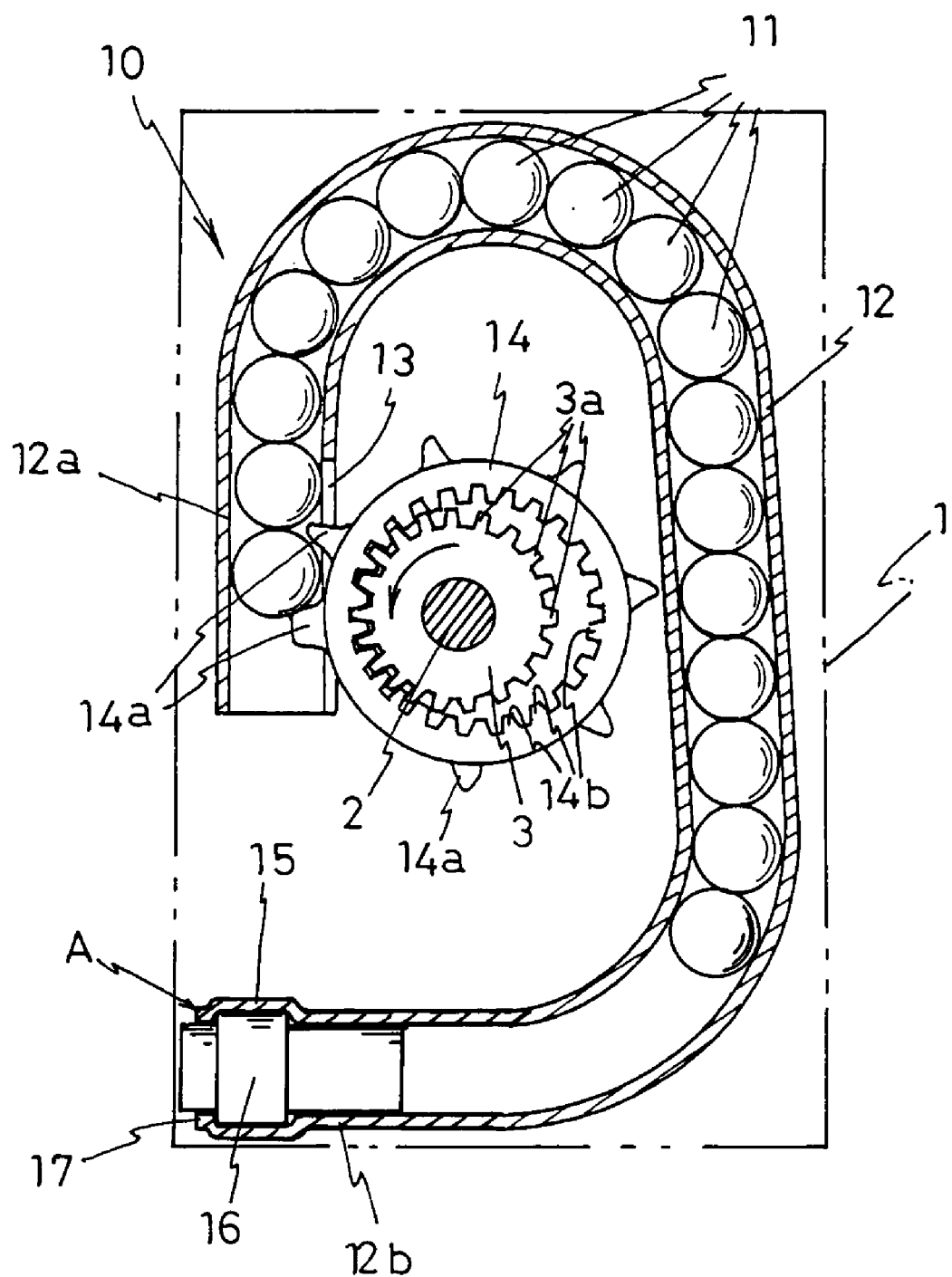
FIG. 1 is a schematic cross-sectional view of a pretensioner in which the structure for the affixing of a gas generator pertaining to the present invention has application.
Figure 2:
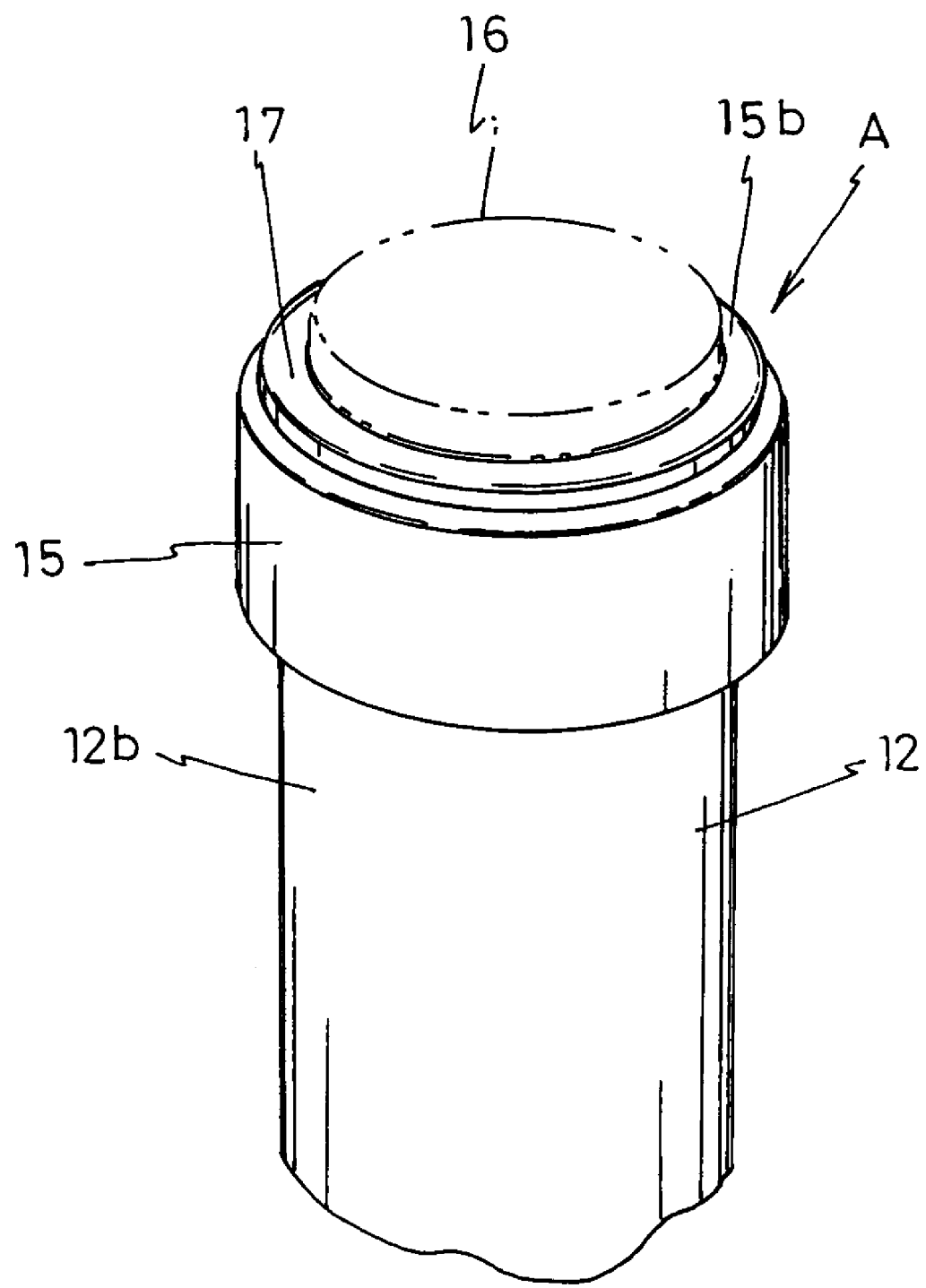
FIG. 2 is an expanded partial perspective view of the gas generator affixing part of the pretensioner of FIG. 1.

Here, FIG. 1 is a schematic cross-sectional view of a pretensioner in which the present invention has application, and FIG. 2 is an expanded perspective view of the gas generator affixing part that constitutes the main part of the pretensioner. In addition, FIGS. 3 to 6 are schematic cross-sectional views of the gas generators affixing procedure, and FIG. 7 is a schematic cross-sectional view of a complete gas generator affixing part.

A pretensioner 10 shown in the drawings comprises a pipe 12 for the housing and guiding of a plurality of balls 11 that constitute drive means. A notch 13 is formed in one end part 12a of the pipe 12, and part of a ring gear 14 is arranged to face the notch 13. In addition, a gas generator housing part 15, which is formed as an expanded section of the pipe 12, is formed in the other end part 12b of the pipe 12 and, as is described below, a gas generator 16 is held in the housing part 15.

The ring gear 14 of the abovementioned pretensioner 10 is positioned in a state in which outer gear teeth 14a penetrate deep into the pipe 12 by means of a pin not shown in the drawings. Meanwhile, a driven gear 3, which is fixed to a belt retractor shaft 2 of the seat belt device 1, is arranged in the abovementioned ring gear 14. In the normal state of the pretensioner 10 inner teeth 14b of the abovementioned ring gear 14 and teeth 3a of the driven gear 3 do not engage.

In the pretensioner 10, explosive contained in the gas generator 16 explodes in response to a signal generated upon collision of the vehicle and, because of the pressure produced as a result, the balls 11 are accelerated in the direction of the one end part 12a of the pipe 12, the pin for positioning the above-mentioned ring gear 14 is broken by the balls 11, and the ring gear 14 moves in the direction of the driven gear 3, whereby the inner teeth 14b of the ring gear 14 and the teeth 3a of the driven gear 3 engage. The ring gear 14 is turned further by the balls 11, the turn of the ring gear 14 is thereby transferred to the driven gear 3, the belt retractor shaft 2 is turned, and the seat belt not shown in the diagram is retracted.

The affixing of the gas generator 16 in the pipe 12 of the abovementioned pretensioner 10 is implemented as follows.

Figure 3:
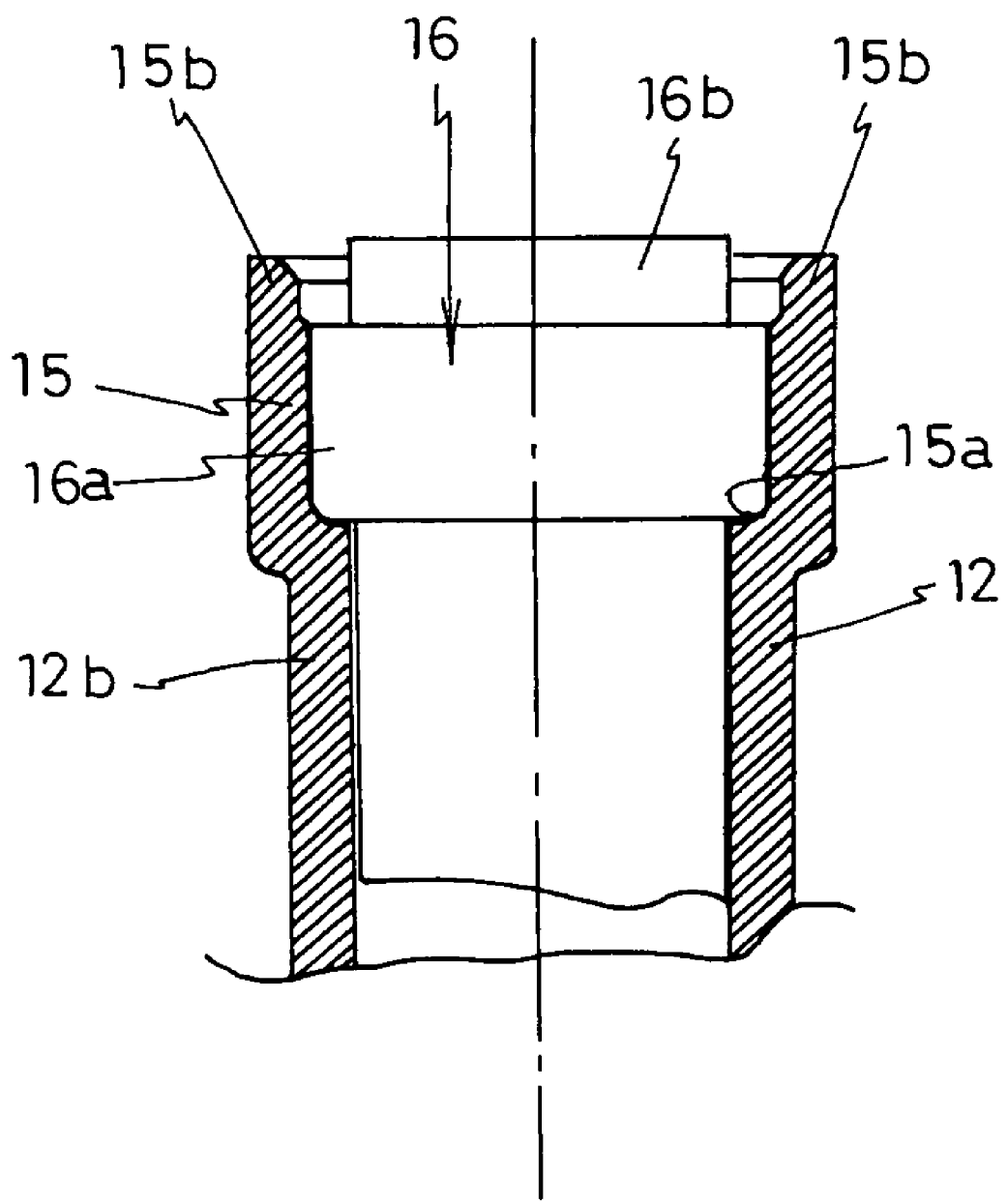
FIG. 3, which shows the procedure for affixing the gas generator of the pretensioner of FIG. 1, is a cross-sectional view of the state in which the gas generator is fitted in the housing part of the pipe.

First, as shown in FIG. 3, the gas generator 16 is housed in the abovementioned gas generator housing part 15 formed in the other end part 12b of the pipe 12.

In this state, the gas generator 16 is provided in such a way that a large diameter part 16a, which constitutes the main part thereof, is positioned in the housing part 15 by means of a stepped part 15a of the housing part 15, and in such a way that an opened end 15b of the pipe 12 defining the housing part 15 projects outward in the axial direction from the large diameter part 16a.

Figure 4:
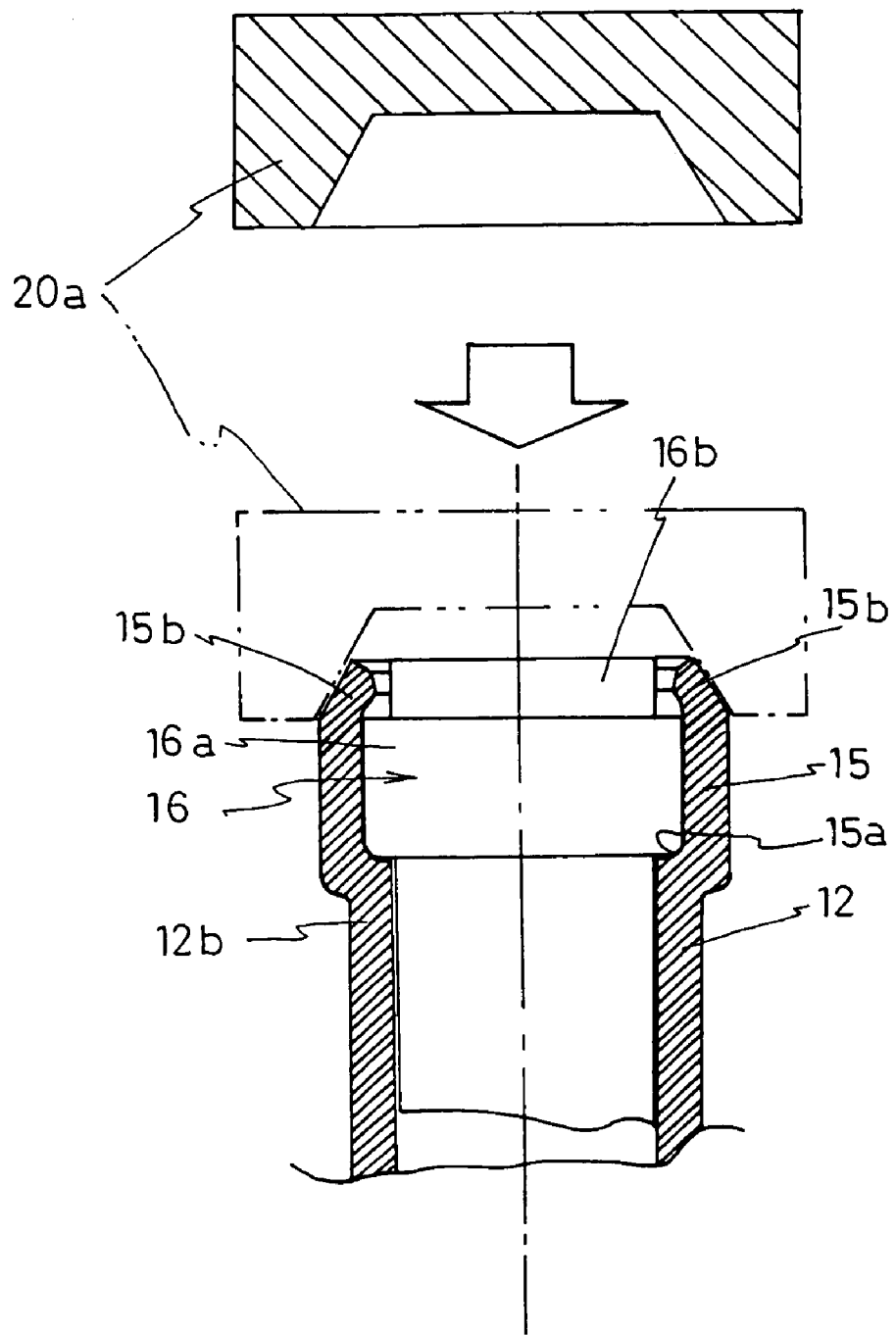
FIG. 4, which shows the procedure for affixing the gas generator of the pretensioner of FIG. 1, is a cross-sectional view illustrating a first pressing process.

Next, as is shown in FIG. 4, the whole of the opened end 15b of the pipe 12 defining the housing part 15 is deformed first in the shaft core direction by a press die 20a in such a way that it describes an angle of approximately 30° with respect to the shaft core.

Figure 5:
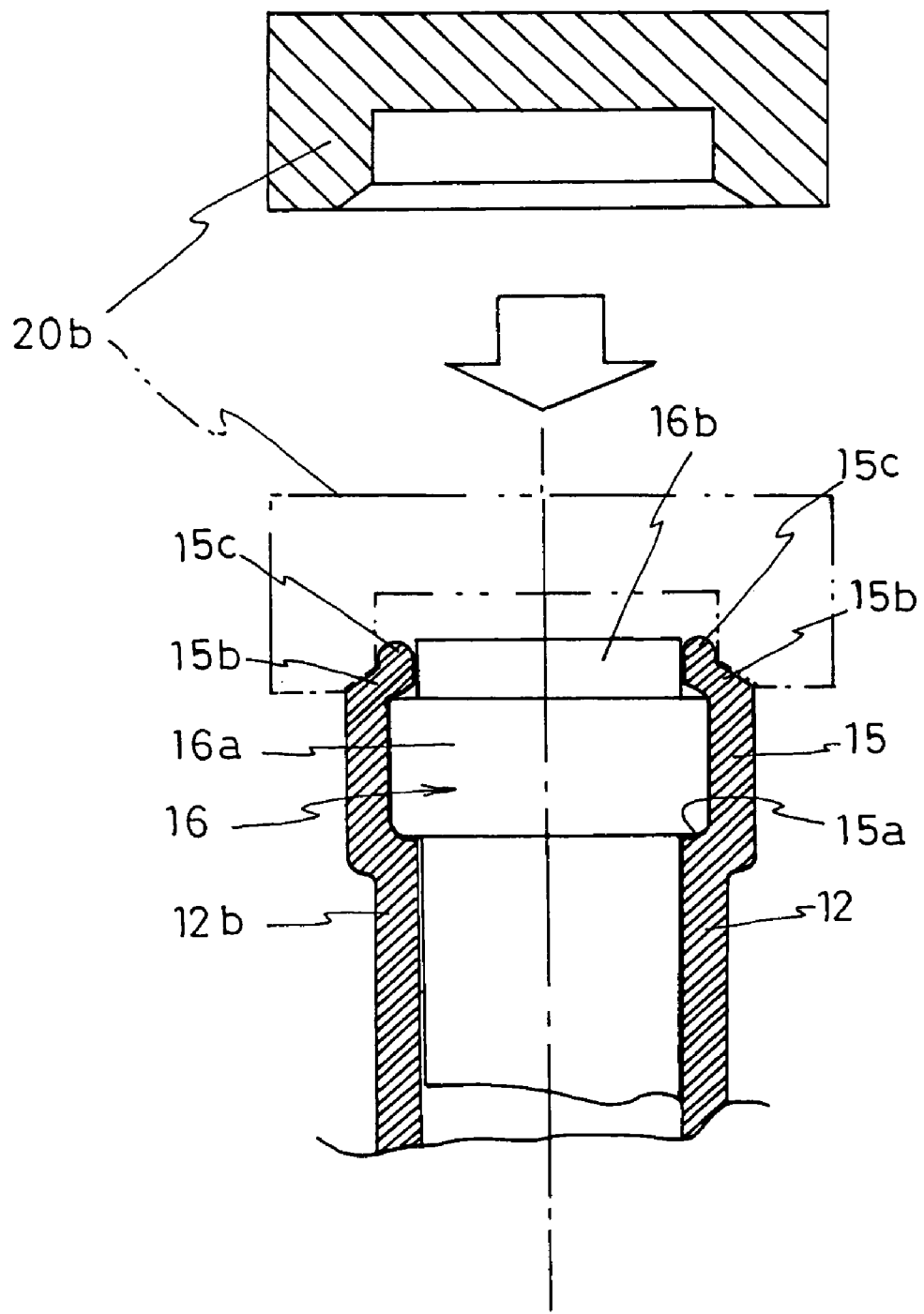
FIG. 5, which shows the procedure for affixing the gas generator of the pretensioner of FIG. 1, is a cross-sectional view illustrating a second pressing process.

Next, as is shown in FIG. 5, the opened end 15b of the pipe 12 is further deformed in the shaft core direction by a press die 20b in such a way that it describes an angle of approximately 60° with respect to the shaft core, and to form a build-up part 15c in the inner circumferential edge part.

In this state, the opened end 15b of the pipe 12 is provided in such a way that the tip-end thereof abuts the circumferential surface of the small diameter part 16b of the gas generator 16.

Figure 6:
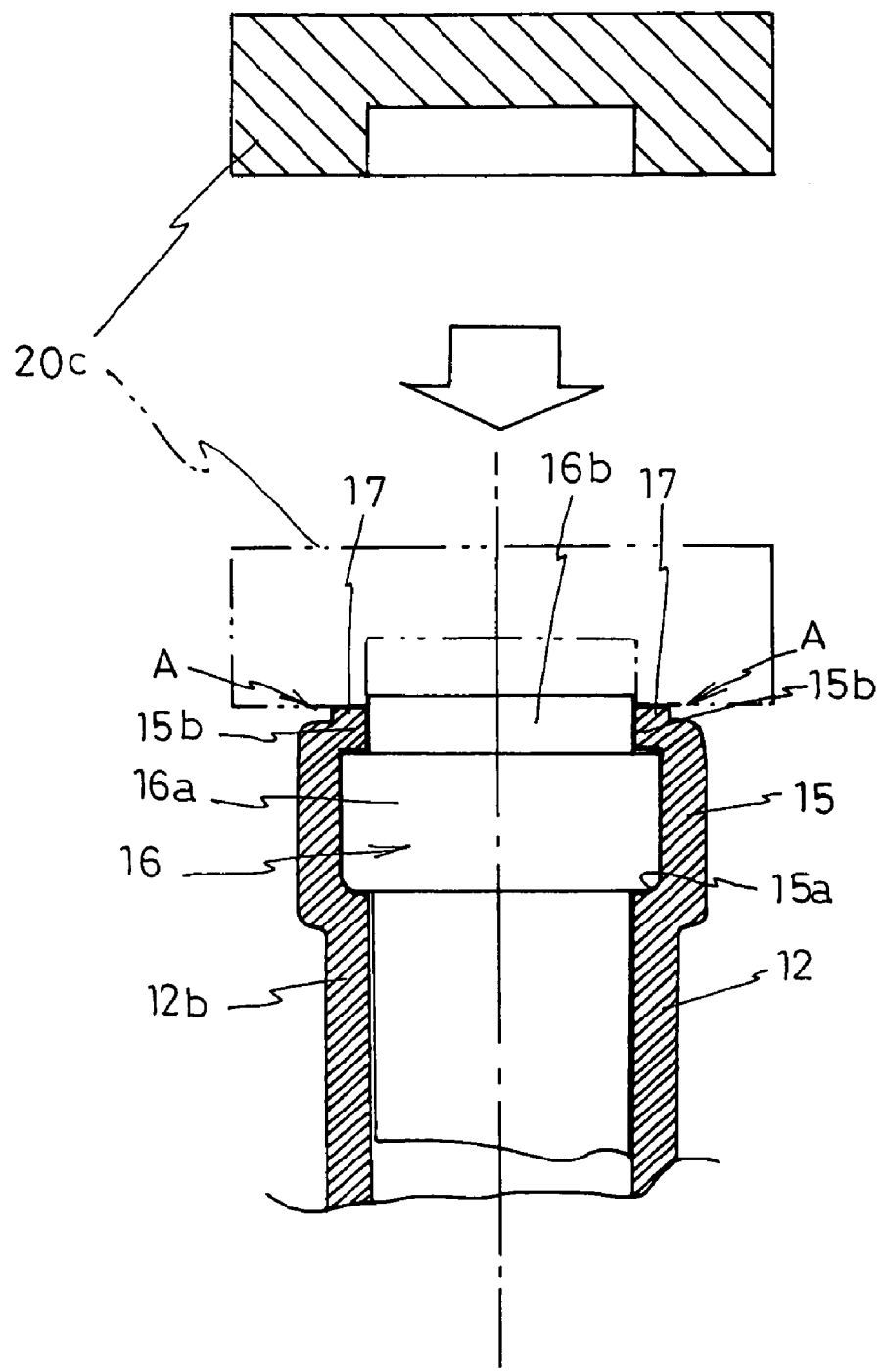
FIG. 6, which shows the procedure for affixing the gas generator of the pretensioner of FIG. 1, is a cross-sectional view illustrating a third pressing process.
Figure 7:
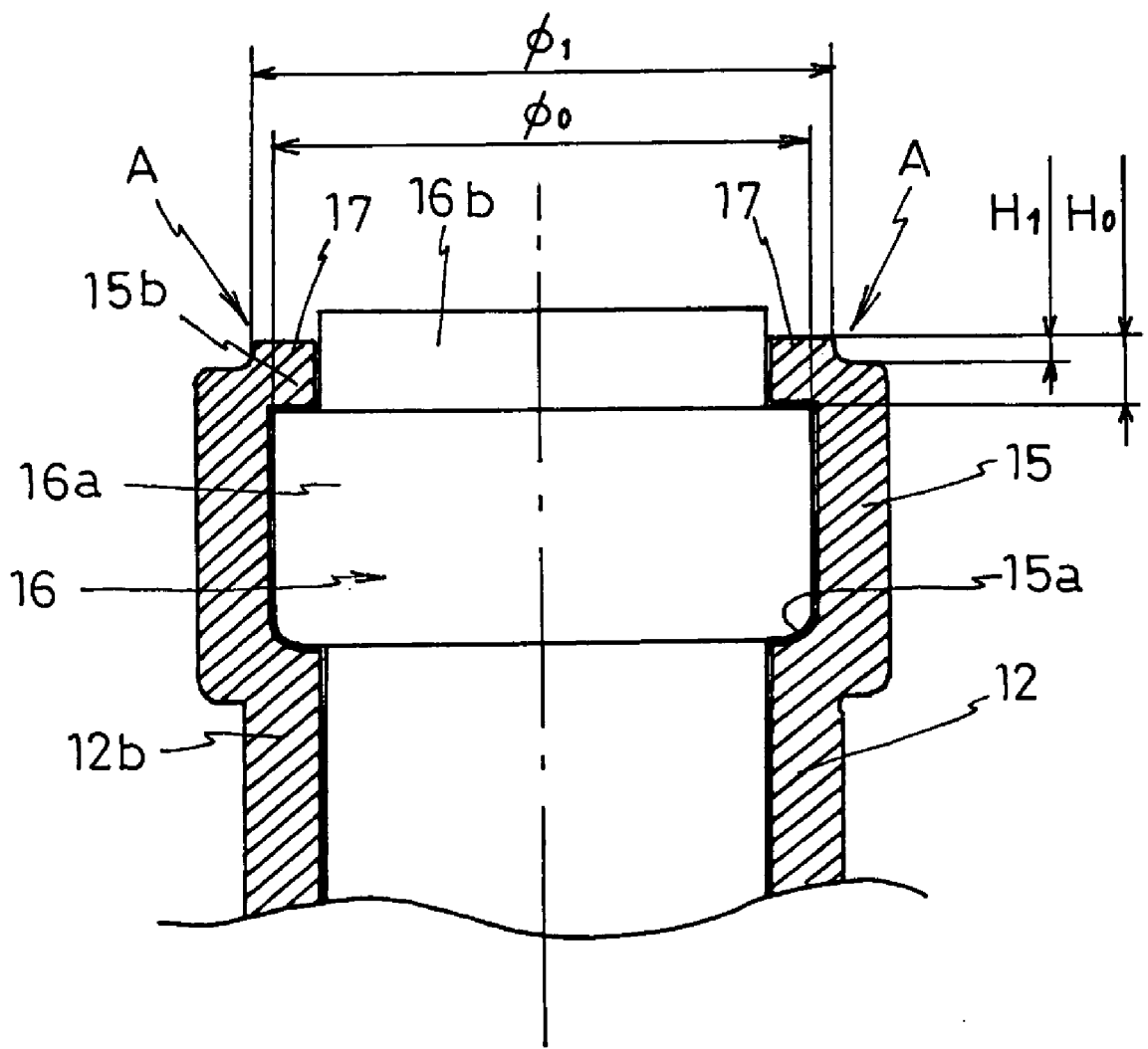
FIG. 7 is an expanded partial cross-sectional view of the gas generator affixing part pertaining to the present invention.

Next, as is shown in FIG. 6, the opened end 15b of the pipe 12 is deformed by a press die 20c to complete the calking processing.

In this state, the opened end 15b of the pipe 12 traces and abuts the large diameter part 16a and the small diameter part 16b of the gas generator 16, and an annular rib 17 that projects outward in the axial direction is formed in the inner circumferential side edge of a calked part A.

The annular rib 17 is preferably formed so that the outer diameter $Ö_1$ thereof shown in FIG. 7 is larger than the outer diameter $Ö_0$ of the large diameter part 16a of the gas generator 16 and, in addition, so that the projecting height $H_1$ thereof is no less than 0.15 times the thickness $H_0$ of the annular rib 17 because it facilitates the formation of the annular rib 17 having high strength by calking using a press, and because it facilitates the efficient prevention of the detachment of the gas generator 16 when explosion occurs.

EXAMPLES

Using the method for the affixing of the pretensioner gas generator pertaining to the abovementioned present invention, six pretensioners embodying the structure for the affixing of a pretensioner gas generator pertaining to the present invention and having an annular rib 17 of outer diameter 19.0 mm (outer diameter $Ö_0$ of the large diameter part 16a of the gas generator 16 of 16.9 mm) and projecting height $H_1$ 0.45 mm (0.20 times the thickness $H_0$ (2.20 mm) of the annular rib 17), were produced.

Following the implementation of gas generator blasting tests on three of the six pretensioners, none of the gas generators of these three pretensioners was detached from the pipe and, in addition, there were no abnormalities of any kind observed in the calked part A.

It should be noted that the quantity of explosive used in the gas generator was the usage upper limit quantity as established in recent years.

In addition, following the implementation of gas generator pulling tests on the remaining three pretensioners, none of the gas generators of these three pretensioners was pulled away from the pipe and the pipe itself was found to have fractured along its length. The average fracture load of the pipe was found to be 36 kN.

On the other hand, as a comparative example, six pretensioners were produced in which, apart from the lack of the annular rib 17, the thickness of the calked part A and the width of the calked part A were the same as that of the abovementioned example.

As a result of the implementation of blasting tests on three of these six pretensioner using the same quantity of explosive as used for the above mentioned example, the gas generator of one of the pretensioners was detached from the pipe and in the remaining two the calked part A had lifted off and the gas generator was loose in the housing part.

In addition, following implementation of gas generator pulling tests on the remaining three pretensioners, the gas generators of all three pretensioners were found to have been pulled way from the pipe and the average pulling load thereof was found to be 31 kN.

What is claimed is:

1. Structure for the affixing of a pretensioner gas generator wherein the gas generator is held in a pipe by the expanding of the end part of the pipe to form a housing part for the gas generator, the housing of the gas generator in the housing part, and the calking of the opened end of the pipe, and an annular rib that projects outward in the axial direction is formed in the inner circumferential edge part of the calked part.

2. Structure for the affixing of the pretensioner gas generator according to claim 1, wherein the outer diameter of the annular rib is formed to be larger than the outer diameter of the gas generator.

3. Structure for the affixing of the pretensioner gas generator according to claim 1, wherein the projecting height of the annular rib projecting outward in the axial direction is no less than 0.15 times the thickness of the annular rib.

4. A pretensioner gas generator affixing method, wherein the annular rib described in claim 1 is formed by a press-processing.

5. A pretensioner gas generator affixing method, wherein the annular rib described in claim 2 is formed by a press-processing.

6. A pretensioner gas generator affixing method, wherein the annular rib described in claim 3 is formed by a press-processing.

* * * * *